United States Patent [19]
Klock et al.

[11] 3,853,760
[45] Dec. 10, 1974

[54] SEWAGE OZONIZING UNIT

[75] Inventors: Byron V. Klock; Rudolph C. White, both of Richmond, Va.

[73] Assignee: Texaco Inc., New York, N.Y.

[22] Filed: Mar. 28, 1973

[21] Appl. No.: 345,636

[52] U.S. Cl. ............... 210/63, 210/71, 210/181, 210/192, 210/195, 210/199, 210/73, 261/DIG. 42, 261/93
[51] Int. Cl. .................. C02b 1/34, C02b 3/08
[58] Field of Search ............ 210/10, 15, 18, 62, 63, 210/71, 72, 97, 152, 181, 192, 195, 197, 199, 206, 209, 73; 261/93, 123, DIG. 42

[56] References Cited
UNITED STATES PATENTS

| | | | |
|---|---|---|---|
| 697,069 | 4/1902 | Brushaber | 261/93 |
| 3,135,686 | 6/1964 | Campbell et al. | 210/15 X |
| 3,272,740 | 9/1966 | Gitchel et al. | 210/10 X |
| 3,359,200 | 12/1967 | Gitchel et al. | 210/10 X |
| 3,472,390 | 10/1969 | Pall et al. | 210/152 X |
| 3,549,528 | 12/1970 | Armstrong | 210/63 X |
| 3,671,403 | 6/1972 | Hess et al. | 210/63 X |

OTHER PUBLICATIONS

Physiochemical Process – For Water Quality Control, Weber, 1972, pp. 363–366, John Wiley and Sons, Inc.

Primary Examiner—John Adee
Assistant Examiner—Robert H. Spitzer
Attorney, Agent, or Firm—T. H. Whaley; C. G. Ries

[57] ABSTRACT

A sewage ozonizing unit for the disposal of waste sewage from a small installation such as a service station includes a primary settling zone receiving the sewage and separating raw sludge from liquid. A first pump conveys the water to a storage zone and actuates an ozonizer supplying ozone through a gas diffuser to the storage zone. A second pump forces the settled sludge to a coking zone wherein it is coked in the liquid phase. The coke thus formed then passes to a pressure settling device where it is separated from the aqueous coking effluent which is recycled to the storage zone.

4 Claims, 3 Drawing Figures

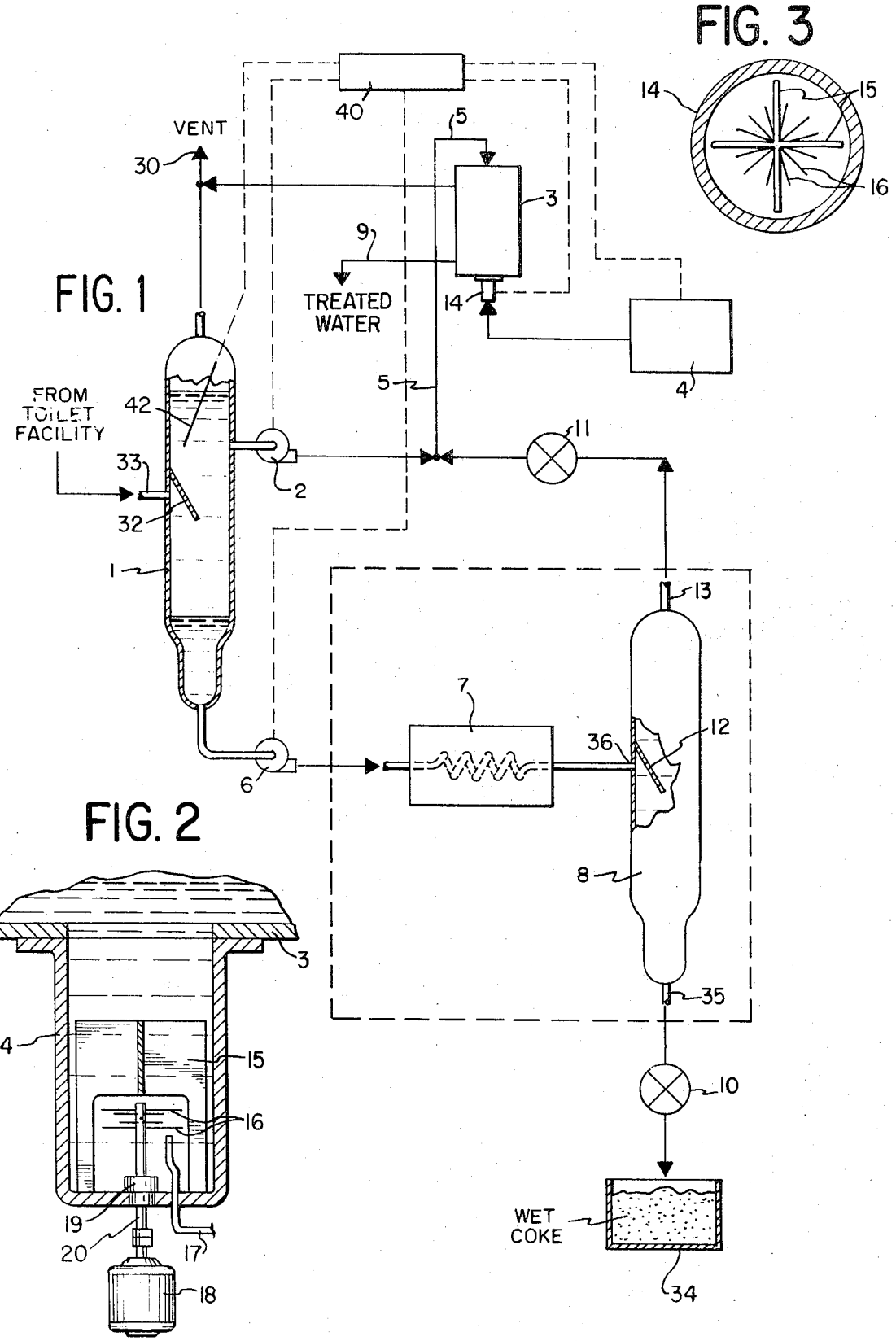

SEWAGE OZONIZING UNIT

This invention relates to the art of sewage treatment as well as the equipment employed in an effort to obtain the most satisfactory results.

The invention is concerned particularly and specifically with a compact sewage treatment unit employing water recycle liquid phase coking and the use of ozone supplied through a special ozone-water contacting device. The unit is particularly designed for small installations such as gas stations, in areas not readily served by municipal type sewage systems.

The main object of this invention will be apparent from the following description taken in conjunction with the accompanying drawings in which FIG. 1 is a schematic representation of a preferred form of the invention adapted for use in a gas station. FIG. 2 is a cross-sectional view of the ozone-water contacting device used in the unit of FIG. 1 and FIG. 3 is a top plan view of the device of FIG. 2.

Briefly stated, the unit of the invention comprises an ozonizer connected to an ozone-water contacting device; a first primary settling zone for receiving liquid sewage and separating liquid from solid wastes communicating with a second water treating and storage zone, synchronous means for pumping liquid from the settling zone to the water treating zone and for supplying ozone from the ozonizer through the ozone water contacting device to the second zone, a liquid phase coking device; means for bringing solid waste from the first zone to the coking device, a separating zone communicating with the coking zone for separating coke from coking effluent and conduit means for recycling aqueous coking effluent to the water treating zone.

With continued reference to the drawing, waste water from toilet facilities of a gas station including that from urinals, toilets, and wash basins flows by gravity into a vented tank 1 having a vent 30 located above the gas station building. Tank 1 is essentially the equivalent of a primary settler in a conventional sewage plant.

Vessel 1 separates the toilet facility waste into a raw primary sludge layer at the bottom and a water layer essentially free from suspended solids. As shown, vessel 1 has a baffle 32 mounted therein at about a 45° angle to its lower inner side just above sewage inlet 33 to prevent upflow of solids. Pump 2 is on level control and periodically pumps water from tank 1 to storage tank which is located on the roof of the station.

The ozonizer 4 is connected to tank 3 through a gas diffuser 14 which reduces the gas-contacting depth by a factor of 20 over the depth used in current practice in ozone-water contacting devices. Tank 3 has an outlet 9 for the treated water going to an effluent discharge point.

The diffuser is shown in greater detail in FIG. 2 and 3. As shown, the diffuser has four baffles 15 arranged in intersecting fashion so as to form an X shaped structure. Their lower extremities are cut to provide a recess in which rotate wires 16 mounted on the extremity of shaft 20 of motor 18. The wires are so positioned within the diffuser as to lie just above the end of gas inlet 17 which connects the diffuser with the ozonizer. A rotating seal 19 surrounds the shaft 20.

In operation, ozone is supplied by the ozonizer 4 and enters through the gas inlet 17, rises as large bubbles, and hits the rapidly (1,000–3,000 rpm) spinning wires 16. The wires shatter the bubbles into very small, slow-rising bubbles, giving a high liquid-gas interface. The baffles provide shear. Since the wires offer little resistance against motion through liquid, little horsepower is expended in stirring the liquid; the liquid above the baffles is quiescent and consists of a finely dispersed gas liquid emulsion having a milky appearance.

The settled sludge layer, periodically, on time cycle control is pumped up to system pressure of 500 to 3,000 psig by pump 6 and then passes through electrical heater 7. Heater 7 is designed to have the capacity to heat the sludge to between 550°F. and 750°F. and is of sufficient size to allow a one minute residence time in the heater. The coked sludge then passes to a pressure settler 8 where the coke settles rapidly and may be withdrawn periodically as wet coke through outlet 35 into a suitable container 34 by pressure blow down in reducing valve 10. The liquid from the top of settler 8 passes through liquid outlet 13 a pressure reducing valve 11, into line 5 and into vessel 3. As this coker effluent stream passes through line 5, the ozonizer is activated on time cycle control to meter sufficient ozone to take care of the COD of the coker effluent stream. Synchronous means for pumping liquid from the settling zone 8 to water treating and storage zone or tank 3 are provided by electrically connecting pumps 2 and 6, ozonizer 4 and diffuser 14 to a single electrical switch 40 as shown in dotted lines in the drawing. Switch 40 is turned on and off by a mechanical liquid level control 42 placed in primary settler or vessel 1. The wet coke rejected is a sterile, nonputrescible, material with low odor and can suitably be used as land fill or soil conditioner.

As shown, vessel 8 has a baffle 12 mounted therein at about 45° to its inner lower wall above effluent inlet 36 to prevent upward flow of coke.

It will be obvious to those skilled in the art that various changes can be made in the described invention without departing from the scope thereof and therefore the invention is not limited by that which is illustrated in the drawing and described in the specification but only as indicated in the appended claims.

What is claimed is:

1. In combination in a sewage treatment unit for the disposal of waste sewage from a small installation, an ozonizer; a primary settling zone for receiving liquid sewage and separating liquid from solid wastes communicating with a water treating and storage zone; a gas diffuser communicating with said ozonizer and with said water treating and storage zone for introducing ozone therein in finely dispersed form; said diffuser including a gas inlet in fluid communication with said ozonizer and a plurality of baffles disposed therein each having a recess in their lower extremity; a driven shaft having a plurality of wires extending radially therefrom into said recesses and positioned adjacent said inlet so as to contact ozone issuing from said inlet and disperse same in the form of very small bubbles in the water contained in said water treating zone; synchronous means for pumping liquid from the settling zone to the water treating zone and for supplying ozone from said ozonizer to said water treating and storing zone, a liquid phase coking device, means for bringing solid waste from said primary settling zone to said coking device, a separating coke from coking effluent and conduit means for recycling aqueous coking effluent to said water treating zone.

2. The unit of claim 1 further including a sewage inlet in said primary settling zone, and a baffle mounted in said zone above said inlet for prevent upward flow of solid materials.

3. The unit of claim 1 further including an inlet in said separating zone for said coking effluent and a baffle in said separating primary zone above said inlet to preventing upward flow of coke.

4. A process for treating aqueous waste sewage comprising in combination conveying said sewage to a primary settling zone; separating liquid from solids wastes; flowing said liquid to a water storage and treating zone; synchronously supplying ozone to said liquid; coking said solid waste under a pressure of about 500 to 3,000 psig at a temperature between about 550°F and 750°F to form coke and a liquid effluent; separating said coke from said effluent; recycling said effluent to said water storage and treating zone; periodically treating said effluent with ozone as said effluent passes to said last mentioned zone; and dispersing said ozone in said effluent in the form of very small bubbles by contacting said ozone upon entering said zone with rotary dispersing means.

* * * * *